June 15, 1954 H. HOFER 2,681,404
PORTABLE ELECTRIC BAKING APPARATUS
Filed July 6, 1950 2 Sheets-Sheet 1
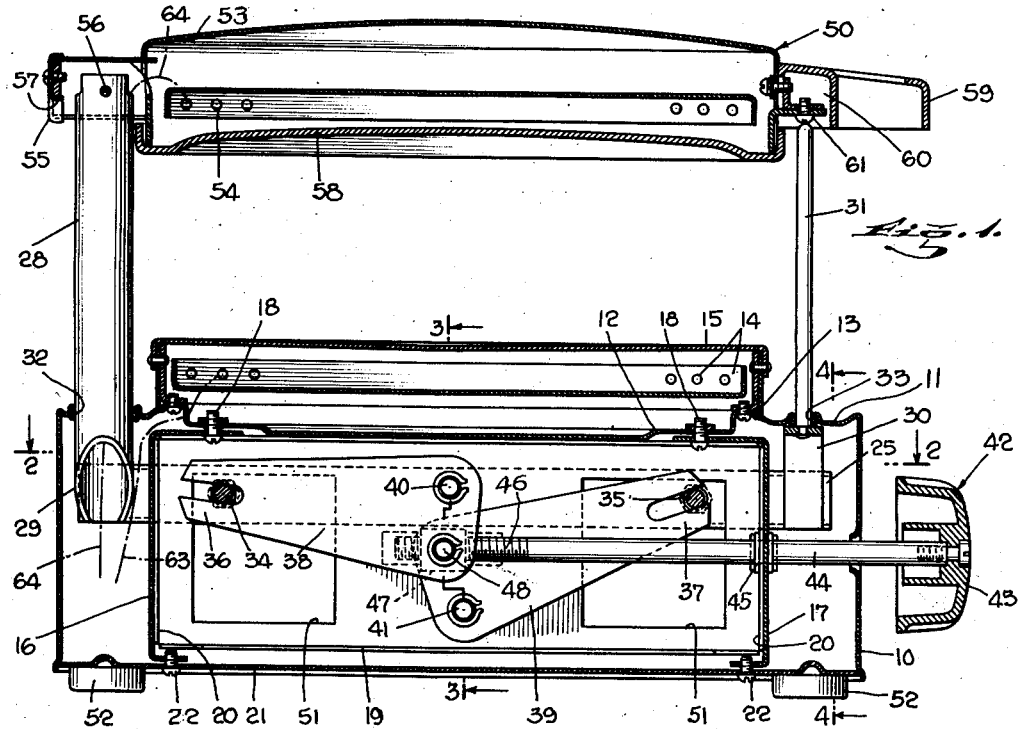
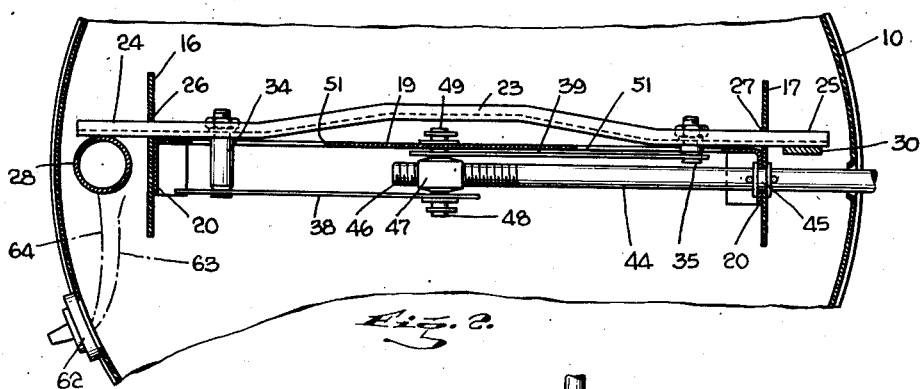
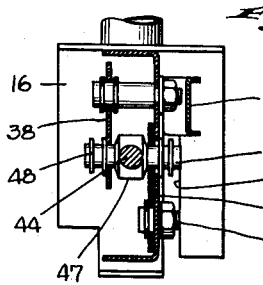
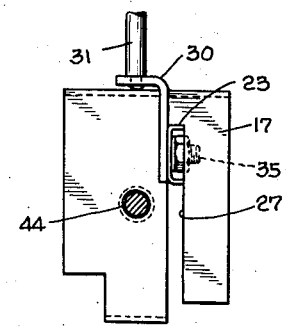
INVENTOR
HANS HOFER
BY
Howard Thompson
ATTORNEY June 15, 1954  H. HOFER  2,681,404
PORTABLE ELECTRIC BAKING APPARATUS
Filed July 6, 1950  2 Sheets-Sheet 2
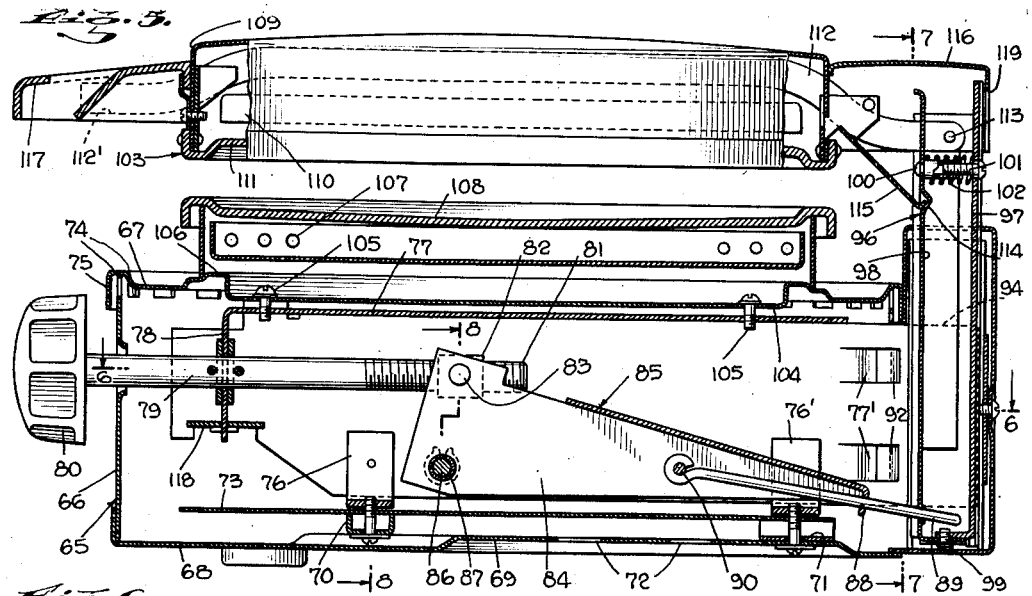
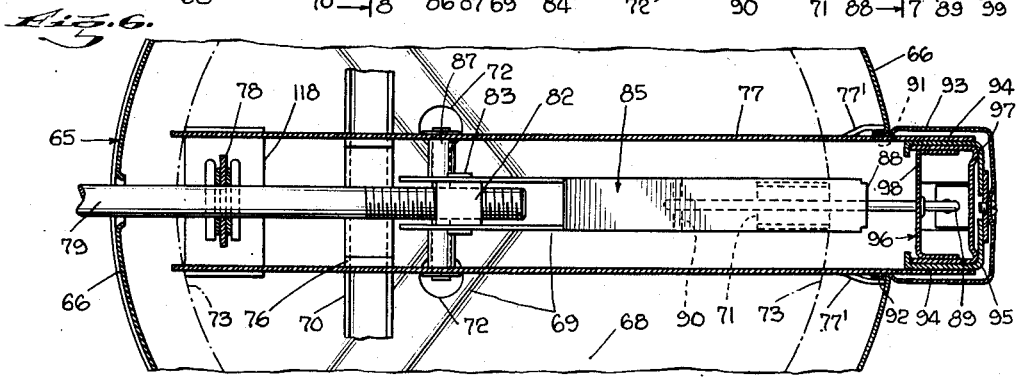
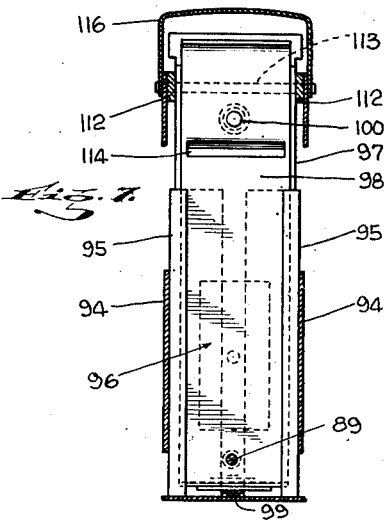
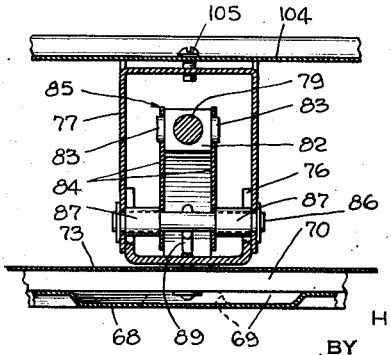
INVENTOR
HANS HOFER
BY
Howard E. Thompson
ATTORNEY Patented June 15, 1954

2,681,404

UNITED STATES PATENT OFFICE 2,681,404

PORTABLE ELECTRIC BAKING APPARATUS

Hans Hofer, Aarau, Switzerland, assignor to Hans Hofer, Jr., Zurich, Switzerland Application July 6, 1950, Serial No. 172,354

3 Claims. (Cl. 219—19)

This invention relates to a portable electric baking apparatus designed for use in the preparation of various types and kinds of food, including the preparation of cakes, pastries, cookies and the like. More particularly, the invention deals with an apparatus employing upper and lower electric heating units adjustable toward and from each other in adapting the apparatus to the various intended uses. Still more particularly, the invention deals with an apparatus employing a manually operated control for adjusting the spacing of the heating elements one with respect to the other and said adjusted element having means for pivotally mounting the same to swing relatively to the other fixed element.

The novel features of the invention will be best understood from the following descriptions, when taken together with the accompanying drawings, in which the separate parts are designated by suitable reference characters in each of the views and, in which:

Fig. 1 is a sectional view through one form of apparatus which I employ showing the heating elements in wide spaced adjustment with respect to each other.

Fig. 2 is a partial section on the line 2—2 of Fig. 1, omitting parts of the construction.

Fig. 3 is a partial section on the line 3—3 of Fig. 1.

Fig. 4 is a partial section on the line 4—4 of Fig. 1.

Fig. 5 is a view similar to Fig. 1 showing another form of construction and with the heating elements in close proximity to each other.

Fig. 6 is a partial section on the line 6—6 of Fig. 5, omitting part of the construction.

Fig. 7 is a section on the line 7—7 of Fig. 5, omitting parts of the construction; and Fig. 8 is a section on the line 8—8 of Fig. 5, omitting parts of the construction.

In the customary procedure of preparing foods, cakes, pastries and the like, the same are prepared in what is commonly referred to as an oven or bake oven, and, as a result, and largely due to the inability to thoroughly clean oven compartments, undesirable aromas developed in a heating oven are transmitted to the food being baked in the oven, thus such food may be said to be contaminated, or penetrated by undesirable flavors. In using the term "contaminated," it is intended to convey that the food being prepared may be flavored or seasoned in an objectionable manner by the impure atmosphere which prevails within the oven compartment. Furthermore, the preparations of foods in baking ovens are not efficient from a standpoint of the need to heat a relatively large oven area.

I have found that the above and other objectionable features to the present method of procedure can be overcome and the preparation of various foods economised by employing a baking apparatus comprising a pair of relatively adjustable heating units which operate in atmosphere and, yet, provide between the area of the elements a baking field in which various types of food can be prepared without being subjected to foreign aromas. This method of procedure will result in the production of various foods having the desired taste or flavor properties or characteristics. Still further, by providing adjustment of the heating elements one with respect to the other, the apparatus lends itself to the preparation of foods of different types and kinds within the capacity of adjustment of the elements, one with respect to the other and, in some instances, in the control of baking characteristics, the latter being particularly true in the preparation of cookies, pastries and the like.

In Figs. 1 to 4, inclusive, I have shown one adaptation of my invention, in which 10 represents a casing, which, in the construction shown, is cylindrical in form. The casing 10 has a top wall portion 11 having a centrally depressed part 12, encircled by a raised ring portion 13, in connection with which an electric heating element of any type is mounted, the element being diagrammatically represented at 14 in Fig. 1 of the drawing. Arranged over the heating element is a pan portion 15 which may be directly utilized as a grill or as a support for any type or kind of cooking vessel or receptacle, upon which the food being prepared is arranged.

Supported upon opposed portions of the depressed wall 12 are a pair of brackets 16 and 17 secured in position by screws, as at 18. The brackets 16 and 17 constitute part of a frame, the other member 19 of which bridges the brackets and includes flanged end walls 20 which are welded or otherwise secured to the brackets 16 and 17. The brackets 16 and 17 serve to support a removable base plate 21 closing the bottom of the casing, the plate being held in position by screws 22.

An offset channelled bar 23 is arranged at one side of the frame member 19, note Fig. 2, this bar having ends 24 and 25 which protrude through and are guided in apertures 26 and 27 in the brackets 16 and 17, one of these apertures, the aperture 27, being clearly seen in Fig. 4 of the drawing. Welded or otherwise secured to the end 24 of the bar 23 is a vertical, tubular column 28, the lower end of which is cut away, as seen at 29, to provide free movement of electric circuit wire relatively to the tube or column, as later described. Welded or otherwise secured to the end 25 of the bar 23 is an L-shaped bracket 30 which supports a vertically extending rod 31, the function and operation of which will be later set forth. It will be noted from a consideration of Fig. 1 of the drawing that the tube or column 28 operates in an aperture 32 in the wall 11; whereas, the supporting rod 31 operates in another aperture 33 in said top wall.

Fixed to the bar 23 inwardly of the brackets 16 and 17 are two pins 34 and 35, these pins having grooved ends for reception of forked ends 36 and 37 of two operating levers 38 and 39, which are arranged within the frame, the levers being pivoted to the member 19 of the frame, as seen at 40 and 41, respectively. The pivots 40 and 41 are disposed centrally of the frame member 19 and the coupling of the levers 38 and 39 with the pivots are sufficiently free to compensate for movement contributed to the levers by an adjustment and control element generally identified by the reference character 42.

The element 42 comprises a fingerpiece knob 43 fixed to one end of a shaft 44 which passes through the casing 10 and has a bearing in the bracket 17 and flange 20, as at 45, so constructed as to prevent axial movement of the shaft 44 in the bracket 17. The inner end of the shaft 44 is threaded, as seen at 46, and this threaded portion engages a feed stud 47. The stud 47 has oppositely disposed pin portions 48 and 49 operating in the levers 38 and 39, respectively, in contributing feed motion thereto to raise and lower the bar 23 with the column 28 and rod 31 thereon.

In Fig. 1 of the drawing, the levers 38 and 39 are shown in their raised position which would represent the top position of adjustment of the top member 50 of the apparatus. It will be noted that the frame member 19 has large openings 51 therein for free movement of the pivot pins 34 and 35 therethrough, as these pins work in the forked ends 36 and 37 of the levers. In referring to the member 50 as the top member of the apertures, the casing 10 can be generally regarded as the bottom member of the apparatus, the latter being usually fixed by resting upon a supporting surface of any kind and to this end supporting feet 52 are employed to prevent marring or destruction to a surface.

At this time, it might be well to point out that the two members of the apparatus may be of any desired contour. However, in most general uses, the round contour will be desirable.

The member 50, in the construction shown, comprises a suitable casing or housing 53, within which is suitably supported the other heating element which is diagrammatically indicated at 54. The casing 53 has a reduced extension 55 at one side, into which the tube or column 28 extends and in which the same is pivoted, as seen at 56, sufficient clearance being provided to facilitate swinging movement of the member 50 on the column in an upward direction. In this connection, it will be noted that the extension 55 is recessed or cut away, as seen at 57, for this purpose.

The casing 53 has suitably fixed to the lower surface thereof a domed pan portion 58, which will be heated by the electric heating element and, in some instances, it will be understood that this pan portion is brought into direct contact with or in close proximity to the food being prepared.

Opposed to the reduced extension 55 is a reduced projecting finger and hand grip portion 59, within which is a housing 60 having suitable stop means, as for example, the screw 61, to check downward movement of the member 50 upon the rod 31. This provides means for maintaining the two members 10 and 50 in parallel relationship to each other at all times, while performing a baking operation. However, at any time, the member 50 may be swung vertically on the pivot 56 to facilitate placement of food upon the pan or grill plate 15, or for any other purpose in the preparation of foods of many different types or kinds.

On one side of the casing 10 is arranged a control switch 62, which may be of any desired construction, for example, including means for regulating temperatures, but as such devices are all well known in the art, a diagrammatic indication of a control switch only is included. The circuit wires 63 and 64 from the switch extend to the heating elements 14 and 54, respectively, of the bottom member 10 and top member 50.

It will be apparent that, by rotating the control knob 43, the top member 50 may be lowered to a position in close proximity to the bottom member 10 and to assume any position within upper and lower limits of adjustment, in the preparation of foods of different types or kinds, where a series of common foods are prepared in what might be termed one baking operation. It will be understood that, after one adjustment of the top member 50 has been made, then insertion and removal of cooking pans, trays or the like can be accomplished by simply swinging the member 50 upwardly on its pivot.

In Figs. 5 to 8, inclusive, I have shown another form of construction which differs from the structure shown in Figs. 1 to 4, inclusive, primarily in utilizing a single operating lever and in dispensing with the supporting rod, as for example, the rod 31.

In Fig. 5 of the drawing, I have shown at 65 a bottom member of the apparatus, which includes a band or ring-like casing portion 66 having a top wall 67 and a bottom wall 68. The bottom wall 68 has an inwardly pressed Y-shaped portion 69, partially seen in Fig. 6 of the drawing, and this inwardly pressed portion forms a support for a channelled strip 70 bridging the flared portion of the Y, as indicated in Fig. 6, and another short supporting strip 71. The inwardly set Y also has perforations 72 therein for admission of air for circulation through the casing 66 around a baffle plate 73 supported on 70 and 71 and out through openings 74 spaced around the top of the casing 66. The openings 74 are concealed by a downwardly extending flange 75 on the top wall 67. Supported on the channelled strips 70 is an upwardly extending U-shaped bearing 76, note Fig. 8, and a similar bearing 76' is supported in connection with the strip 71, as seen in Fig. 5.

Welded or otherwise secured to the bearings 76, 76' is an inverted U-shaped or channel frame 77; the top wall of the frame at one end is bent down to form a bearing plate portion 78, note the left of Fig. 5, which forms a bearing for a shaft 79, generally similar to the shaft 44. In other words, the shaft 79 has an operating knob or head 80 at its outer end outwardly of the casing 66 and its inner end is threaded, as seen at 81, to engage a feed stud or block 82. The block 82 has laterally extending pin portions 83 which operate in the side plates 84 of a channelled-shaped lever, generally identified by the reference character 85.

Mounted in the frame 77 is a pivot pin 86 which passes through the side walls 84 of the lever 85 in forming the pivotal mounting of the lever in the frame 77. Suitable bushings 87 are disposed on the pin 86 to centralize the lever 85 within the frame. The free end of the lever 85 has a downwardly turned flange portion forming a bearing 88 for a lift pin 89. The pin 89 projects beyond the end of the lever and forms an extension thereof and the pin has a pivotal mounting within the lever as indicated at 90.

The casing 66, in alinement with the frame, has a vertical opening, as at 91, note Fig. 6, the opening having inturned flange portions 92 and the frame 77, or the side portions thereof, extend through the opening into a casing or housing portion 93, as at 94. The frame sides have outwardly pressed keepers 77' which engage the flanges 92. Fixed to the extensions 94 is a substantially U-shaped guide channel defined by L-shaped strips 95 for guiding a plunger 96 vertically with respect to the housing 93.

The plunger 96, in the construction shown, is formed from two channelled strips 97 and 98. These strips have inwardly extending overlapping ends which are joined together, as seen at 99 in Fig. 5 of the drawing.

The upper ends of the strips 97 and 98 are yieldably and adjustably coupled by a sleeve 100 secured to the strip 98 and a screw 101 adjustable in the sleeve 100. The screw 101 passes freely through the plate 97 and a spring 102 serves to support and space the plates so as to maintain the upper member 103 of the apparatus in parallel relationship with respect to the lower member 65. The top wall 67 of the lower member 65 has a depressed wall portion 104, with which the frame 77 is coupled, as by screws 105. Around the depressed wall 104 is a ring portion 106, on which is suitably supported and mounted the electric heating element of the bottom member as diagrammatically seen at 107 and over the element 107 is arranged a supporting pan or grill 108.

The member 103 comprises a casing or housing 109 within which is suitably supported an electric heating element partially diagrammatically seen at 110. Below the element 110 is a bottom plate 111, generally similar to the plate 58. The casing or housing 109 is reinforced by stout frame strips, one of which is seen at 112 in Fig. 5 and the pivot ends of both of which are noted in Fig. 7. These strips provide strength to an otherwise lightweight housing construction and also provide a substantial pivot bearing for the pivot pin 113 for pivotally coupling the member 103 upon the upper end of the plunger 96.

The pivot pin 113 extends through the side members of the strip 97. However, the upper end of the strip 98 is cut away to remove the side walls, so as to provide free movement of the strip 98 toward and from the strip 97. In this connection, it will be noted that the strip 98 has an offset seat 114, which is adapted to receive a stop arm 115 fixed to the pivoted end portion of the member 103. It will be apparent that the strips 112 extend into a reduced hood portion 116 of the otherwise circular housing 109 and the plunger extends into this hood portion as will clearly appear from a consideration of Fig. 5 of the drawing.

Opposed to the hood portion 116, the casing 109 has a projecting hand-grip or fingerpiece portion 117 and it is preferred that the ends of the brace frame strips 112 extend into this fingerpiece portion, as indicated at 112', so that the stress and strain of swinging the member 103 is taken-up directly through the reinforcing strips 112 onto the pivot 113.

Considering Fig. 5 of the drawing, it will appear that the bearing plate portion 78 has a bottom support in the side members of the frame 77 by a crossplate 118 which maintains stability of the plate portion 78 within the frame. It will be apparent that the frame 77 is formed from a single strip of metal and this is also true of the lever 85 and many of the other parts of the complete apparatus and this applies as well to the structure shown in Figs. 1 to 4 inclusive.

It will be noted from a consideration of Figs. 2 and 6 of the drawing that the shafts 44 and 79 pass freely through the respective casings, thus compensating for any slight angular variances that may prevail in the shaft in actuating the respective levers. In Fig. 5 of the drawing, the lever 85 is shown in its lowermost position, that is to say, with the members 65 and 103 in close proximity to each other. It will be apparent, however, that by rotating the shaft 79 through the medium of the knob 80, the lever 85 may be swung on its pivot 86, thus moving the plunger 96 upwardly, carrying the member 103 with it in this operation. In any position of the member 103 with respect to the member 65, the member 103 can be swung on the pivot 113 into a raised position to give free working access to the plate or grill 108 for any purpose. It will be noted that the hood 116 is cut away, as seen at 119, to allow for swinging movement of the member 103 to clear the upper end of the plunger 96.

In movement of the member 103 into the lowered position, the stop 115 may strike the seat 114 under pressure, in which operation the plate 98 will move in the direction of the plate 97 against the action of the spring 102 and, then, the spring will return the plate 98 to its normal stop position, maintaining the two members 65 and 103 in substantially parallel relationship to each other. The structure in Figs. 5 to 8, inclusive, is somewhat simpler than that shown in Figs. 1 to 4, in dispensing with the support 31 and the additional lever mechanism to actuate the support.

Considering the structure of Figs. 5 to 8, inclusive, it will be understood that the casing 66 is actually formed from a band or strip of material, the upper edge being cut out at periodic intervals to form the vent apertures 74.

The tubular members 28 and 96 may be said to comprise vertically movable posts and the rod 31 a supplemental post. The posts 28 and 96 serve to couple the top and bottom members of the apparatus and to regulate positioning of said members one with respect to the other by adjustment through the medium of the posts. In this adjustment, a baking field is provided between the heating elements of said members, which field is open to atmosphere. The adjustment of the members may be said to control the depth of this baking field.

Having fully described my invention, what I claim as new and desire to secure by Letters Patent is:

1. An apparatus of the character described, comprising two casing members, an electric heating element within the casing of each member, a hollow post coupling and spacing said members, means guiding said post for maintaining vertical alinement of said members, means within one member operatively engaging the post to adjust spacing of said members one from the other in regulating therebetween a baking field open to atmosphere, means on one member controlling operation of said heating elements, at least one of said members having a supporting plate heated by the electric element thereof, a supplemental post, said first named means comprising a pair of levers pivotally mounted in said member, one lever operatively engaging the first post and the other the supplemental post, and manually actuated means accessible through said member and directly coupled with both levers for actuating the levers in adjustment of said members toward and from each other.

2. An apparatus of the character described, comprising two casing members, an electric heating element within the casing of each member, a hollow post coupling and spacing said members, means guiding said post for maintaining vertical alinement of said members, means within one member operatively engaging the post to actuate the same in said post guiding means to adjust spacing of said members one from the other in regulating therebetween a baking field open to atmosphere, means on one member controlling operation of said heating elements, at least one of said members having a supporting plate heated by the electric element thereof, said first named means comprising a lever pivotally mounted in said member and operatively engaging said post, a manually rotatable threaded shaft, and means operatively engaging the threads of the shaft and said lever whereby rotation of said shaft will actuate said lever to adjust position of said members toward and from each other.

3. An apparatus of the character described, comprising two casing members, an electric heating element within the casing of each other, a hollow post coupling and spacing said members, means guiding said post for maintaining vertical alinement of said members, means within one member operatively engaging the post to actuate the same in said post guiding means to adjust spacing of said members one from the other in regulating therebetween a baking field open to atmosphere, said last named means comprising a pivoted lever operatively engaging the post, a threaded shaft and a part in threaded engagement with the shaft and coupled with the lever in spaced relation to the pivot thereof, means on one member controlling operation of said heating elements, at least one of said members having a supporting plate heated by the electric element thereof, means for pivotally coupling the other member in connection with said post to provide swinging movement of the second member relatively to said first member, means yieldably checking movement of the swinging member in one direction, said last named means including a stop maintaining the second named member in substantially parallel relationship to the first member, and means adjustably controlling said stop.

References Cited in the file of this patent

UNITED STATES PATENTS

| Number | Name | Date |
|---|---|---|
| 1,738,972 | Strader | Dec. 10, 1929 |
| 1,839,112 | Mills | Dec. 29, 1931 |
| 1,856,864 | Claus | May 3, 1932 |
| 1,973,175 | McArdle | Sept. 11, 1934 |
| 2,105,814 | Lent | Jan. 18, 1938 |
| 2,198,645 | Wolcott | Apr. 30, 1940 |
| 2,244,145 | Erickson | June 3, 1941 |
| 2,248,812 | Cretors | July 8, 1941 |
| 2,430,582 | Reich | Nov. 11, 1947 |